United States Patent [19]

Schoenleben et al.

[11] Patent Number: 4,973,761
[45] Date of Patent: Nov. 27, 1990

[54] AMINOMONO- OR -DI-[(POLY-N-BUTOXY)-N-BUTYLAMINO]-(POLY-N-BUTOXY)-N-BUTYLAMINES

[75] Inventors: Willibald Schoenleben, Heidelberg; Herbert Mueller, Frankenthal, both of Fed. Rep. of Germany

[73] Assignee: BASF Aktiengesellschaft, Ludwigshafen, Fed. Rep. of Germany

[21] Appl. No.: 382,906

[22] Filed: Jul. 21, 1989

[30] Foreign Application Priority Data

Aug. 10, 1988 [DE] Fed. Rep. of Germany ....... 3827119

[51] Int. Cl.$^5$ ............................................. C07C 213/02
[52] U.S. Cl. .................................. 564/475; 564/474; 564/505
[58] Field of Search ................... 564/475, 505, 474

[56] References Cited

U.S. PATENT DOCUMENTS

| | | | |
|---|---|---|---|
| 3,352,916 | 11/1967 | Zech | 564/475 |
| 3,384,681 | 5/1968 | Kobayashi et al. | 525/430 |
| 3,824,197 | 7/1974 | Smith et al. | 525/410 |
| 3,824,198 | 7/1974 | Smith et al. | 525/410 |
| 3,824,219 | 7/1974 | Smith et al. | 528/408 |
| 3,824,220 | 7/1974 | Smith et al. | 528/408 |
| 4,181,682 | 1/1980 | Watts et al. | 564/505 |
| 4,618,717 | 10/1986 | Renken et al. | 564/475 |
| 4,766,245 | 8/1988 | Larkin et al. | 564/475 |
| 4,847,417 | 7/1989 | Larkin | 564/475 |

*Primary Examiner*—Glennon H. Hollrah
*Assistant Examiner*—S. Treanor
*Attorney, Agent, or Firm*—Keil & Weinkauf

[57] ABSTRACT

Aminomono- or di-[(poly-n-butoxy)-n-butylamino]-(poly-n-butoxy)-n-butylamines of the general formula I

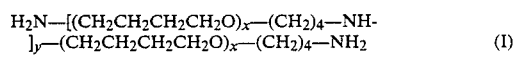
$$H_2N-[(CH_2CH_2CH_2CH_2O)_x-(CH_2)_4-NH-]_y-(CH_2CH_2CH_2CH_2O)_x-(CH_2)_4-NH_2 \quad (I)$$

where x is from 1 to 150 and y is 1 or 2, are prepared by a process in which a hydroxy-(poly-n-butoxy)-butanol of the formula II

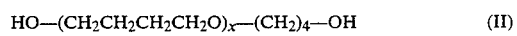
$$HO-(CH_2CH_2CH_2CH_2O)_x-(CH_2)_4-OH \quad (II)$$

where x is from 1 to 150, is reacted with from 1.01 to 300 mole equivalents of ammonia per hydroxyl group in the presence of a hydrogenation/dehydrogenation catalyst and hydrogen at from 150° to 300° C. and under from 20 to 400 bar.

3 Claims, No Drawings

AMINOMONO- OR -DI-[(POLY-N-BUTOXY)-N-BUTYLAMINO]-(POLY-N-BUTOXY)-N-BUTYLAMINES

The present invention relates to novel aminomono or -di-[(poly-n-butoxy)-n-butylamino]-(poly-n-butoxy)-n-butylamines and a process for their preparation.

U.S. Pat. No. 3 824 197, U.S. Pat. No. 3,824,198, U.S. Pat. No. 3,824,219 and U.S. Pat. No. 3,824,220 disclose reactions of dicationic polymers, for the polymerization of tetrahydrofuran, with aqueous ammonia solution and with liquid ammonia at low temperatures ($-70°$ C.).

Furthermore, DE-A-No. 15 95 274 discloses that $\alpha$, $\omega$-dichloropolyalkylene oxide, prepared from tetrahydrofuran, thionyl chloride and $SbCl_5$, can be reacted with liquid ammonia in an autoclave at 120° C. to give the corresponding $\alpha$, $\omega$-diaminopolyalkylene oxide having virtually the same mean molecular weight.

In addition, U.S. Pat. No. 4,181,682 discloses that the primary alcohol functions in $\alpha$, $\omega$polybutanediol cannot be reacted with ammonia using catalysts for reductive amination. The primary alcohol functions are therefore converted into secondary ones with propylene oxide and these secondary alcohol functions are then aminated.

It is an object of the present invention to provide novel polymers which are based on tetrahydrofuran and contain primary and secondary amino groups.

We have found that this object is achieved by novel aminomono- or -di-[(poly-n-butoxy)-n-butylamino]-(poly-n-butoxy)-n-butylamines of the general formula I

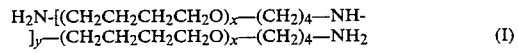

where x is from 1 to 150 and y is 1 or 2, and a process for the preparation of these compounds, wherein a hydroxy-(poly-n-butoxy)-butanol of the general formula II

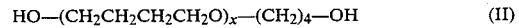

where x is from 1 to 150, is reacted with from 1.01 to 300 mole equivalents of ammonia per hydroxyl group in the presence of a hydrogenation/dehydrogenation catalyst and hydrogen at from 150° to 300° C. and under from 20 to 400 bar.

In formulae I and II, the index x is from 1 to 150, preferably from 3 to 50, particularly preferably from 5 to 35. In formula I, the index y is 1 or 2, preferably 1.

The aminomono- or -di-[(poly-n-butoxy)-n-butylamino]-(poly-n-butoxy)-n-butylamines of the formula I are obtainable by the following method:

The reaction is carried out by bringing a mixture of hydroxy-(poly-n-butoxy)-butanol II, ammonia and hydrogen into contact with a catalytic amount of a hydrogenation/dehydrogenation catalyst, in accordance with the following equation:

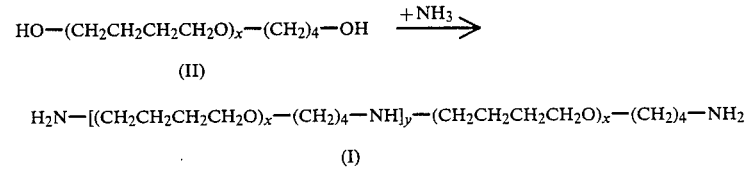

In this reaction, the primary diamine of II was the expected reaction product, particularly with a relatively large excess of ammonia. Surprisingly, the mixture which predominantly or virtually exclusively contains the compound I in which y is 1 and 2 is formed under the reaction conditions. Minor amounts of compounds similar to I, in which y is 0, 3, 4, 5, 6 etc., are formed in some cases.

The reaction is carried out in the liquid phase, batchwise or preferably continuously, at from 150° to 300° C. and under from 20 to 400 bar.

The reaction mixture contains ammonia and the diol in a molar ratio from 2.02:1 to 600:1, preferably from 10:1 to 400:1, particularly preferably from 20:1 to 200:1.

Some of the hydroxy-(poly-n-butoxy)-butanols and their preparation are disclosed in Angew. Chem. 72 (1960), 927.

The water of reaction which forms during the amination may remain in the mixture during the reaction. The hydrogen partial pressure during the reaction is from 25 to 280, preferably from 30 to 250, particularly preferably from 50 to 220, bar.

If necessary, an inert gas, for example nitrogen or argon, preferably nitrogen, is used in addition.

The reaction can be carried out, for example, as a suspension, trickle-bed or liquid-phase reaction at from 150° to 300° C. and under a total pressure of from 20 to 400 bar, preferably at from 150° to 220° C. and under from 60 to 250 bar. It may be advisable to use the diols II in solution in an inert solvent, from 0.10 to 200 ml, preferably from 0.25 to 50 ml, of an inert solvent generally being sufficient per g of II.

Suitable inert solvents are ethers, such as diethyl ether, methyl isopropyl ether, methyl tert-butyl ether, tetrahydrofuran and dioxane, aliphatic hydrocarbons, such as n-pentane, the pentane isomer mixture, n-hexane, the hexane isomer mixture, petroleum ether and cyclohexane, aromatic hydrocarbons, such as benzene, toluene and the xylenes, amides, such as N-methylpyrrolidone, dimethylformamide, dimethylacetamide and their isomer mixtures, and mixtures of these solvents.

Suitable hydrogenation/dehydrogenation catalysts are metals, for example nickel, cobalt, copper and chromium, in finely divided, active form, and mixtures of these metals, if necessary on a conventional carrier.

Suitable hydrogenation/dehydrogenation catalysts are stated in Houben-Weyl, Methoden der Organischen Chemie, Volume 11/1, pages 126–131. Fixed-bed catalysts on a carrier are preferred. The catalysts stated in DE-A-No. 19 53 263 are particularly preferred.

Examples of suitable carriers are pumice, diatomaceous earth, silica gel, thorium oxide and alumina, the catalysts being obtained, for example, by impregnation of the said carriers with corresponding metal salt solutions and subsequent reduction with hydrogen.

The fixed-bed catalysts used may be, for example, extrudates having a diameter of from 2 to 8 mm and a length of not more than 15 mm, pellets in cylindrical form having a diameter of 5 mm and a height of 5 mm, or spheres having a diameter of from 2 to 10 mm.

In the trickle-bed procedure, the reaction mixture is fed, for example, at a rate of from 200 to 1,500 ml per liter of catalyst volume per hour.

After the reaction, the resulting products are isolated by a conventional method, for example by distilling off ammonia and water from the reaction mixture; unconverted starting materials may be recycled to the reaction. Hydrogen and other gaseous components can likewise be recycled to the reactor.

The compounds I are suitable as intermediates for the preparation of elastomers and can be used as intermediates for other polymers, for example epoxy resins.

EXAMPLES

Example 1

For the preparation of a compound I having a mean molecular weight of 1,310, a compound II having a mean molecular weight of 640 was used as the starting material.

The reactor used was a heatable steel tube having an internal diameter of 30 mm, and 500 ml of catalyst were introduced as the fixed bed. The catalyst consisted of a mixture of nickel, cobalt and copper on an $Al_2O_3$ carrier, as described in DE-A-No. 19 53 263, Example 1, and had been pretreated with hydrogen at 300° C. To effect amination, 100 g/hour of a compound I having a mean molecular weight of 640, 250 ml/hour of liquid $NH_3$ and 50 l(S.T.P.)/hour of hydrogen were fed to the reactor. The reaction temperature was adjusted to 210° C. and the pressure to 250 bar. The mixture leaving the reactor was cooled and then passed into a separator, where it was separated continuously into a gas phase and a liquid phase. Ammonia and water were then distilled off from the liquid phase.

The product thus obtained was a wax-like material at 20° C. and a viscous liquid at 30° C. The mean molecular weight, determined by vapor pressure osmometry, was 1,310. The total amine number was 127, the secondary amine number was 41 and the OH number was from 0 to 1 (mg of KOH equivalents per g of substance in each case). The structures $-O-C_4H_8$, $-C_4H_8-NH_2$ and $-C_4H_8-NH-C_4H_8-$ were confirmed by NMR spectroscopy.

Example 2

For the preparation of a compound I having a mean molecular weight of 4,000, a compound II having a mean molecular weight of 2,000 was used as the starting material.

The reaction was carried out similarly to Example 1, except that 50 g/hour of compound II, which had been dissolved in 39 g of cyclohexane and 133 ml/hour of liquid $NH_3$ and 25 l(S.T.P.)/hour of hydrogen were fed in. After ammonia, cyclohexane and water had been distilled off from the reaction mixture, a wax-like product having the following characteristics was obtained: Total amine number=44, secondary amine number=13, tertiary amine number=1, OH number=0.7.

From formula I, with x=26.5 and y=1, the total amine number is calculated as 42 and the secondary amine number as 14.

We claim:

1. An aminomono- or -di-[(poly-n-butoxy)-n-butylamino]-(poly-n-butoxy)-n-butylamine of the formula I $$H_2N-[(CH_2CH_2CH_2CH_2O)_x-(CH_2)_4-NH-]_y-(CH_2CH_2CH_2CH_2O)_x-(CH_2)_4-NH_2 \quad (I)$$

where x is from 1 to 150 and y is 1 or 2.

2. A process for the preparation of an aminomono- or -di-[(poly-n-butoxy)-n-butylamino[-(poly-n-butoxy)-n-butylamine of the formula I $$H_2N-[(CH_2CH_2CH_2CH_2O)_x-(CH_2)_4-NH-]_y-(CH_2CH_2CH_2CH_2O)_x-(CH_2)_4-NH_2 \quad (I)$$

where x is from 1 to 150 and y is 1 or 2, wherein a hydroxy-(poly-n-butoxy)-butanol of the formula II $$HO-(CH_2CH_2CH_2CH_2O)_x-(CH_2)_4-OH \quad (II)$$

where x is from 1 to 150, is reacted with from 1.01 to 300 mole equivalents of ammonia per hydroxyl group in the presence of a hydrogenation/dehydrogenation catalyst and hydrogen at from 150° to 300° C. and under from 20 to 400 bar.

3. A mixture containing an aminomono- or -di-[(poly-n-butoxy)-n-butylamine]-(poly-n-butoxy)-n-butylamine of the formula I $$H_2N-[(CH_2CH_2CH_2CH_2O)_x-(CH_2)_4-NH-]_y-(CH_2CH_2CH_2CH_2O)_x-(CH_2)_4-NH_2 \quad (I)$$

where x is from 1 to 150 and y is 1 or 2, wherein a hydroxy-(poly-n-butoxy)-butanol of the formula II $$HO-(CH_2CH_2CH_2CH_2O)_x-(CH_2)_4-OH \quad (II)$$

where x is from 1 to 150, is reacted with from 1.01 to 300 mole equivalents of ammonia per hydroxyl group in the presence of a hydrogenation/dehydrogenation catalyst and hydrogen at from 150° to 300° C. and under from 20 to 400 bar.

* * * * *